Sept. 7, 1926.

P. L. TENNEY

TRANSMISSION BRAKE

Filed May 21, 1924

1,598,942

Inventor
Perry L. Tenney
By his Attorneys

Patented Sept. 7, 1926.

1,598,942

UNITED STATES PATENT OFFICE.

PERRY L. TENNEY, OF MUNCIE, INDIANA, ASSIGNOR TO GENERAL MOTORS CORPORATION, OF DETROIT, MICHIGAN, A CORPORATION OF DELAWARE.

TRANSMISSION BRAKE.

Application filed May 21, 1924. Serial No. 714,864.

This invention relates to brakes, and is illustrated as embodied in an emergency brake substantially identical with the brakes at present furnished on Oakland and Olds cars.

An object of the invention is to guard against any accumulation of dirt or water between the drum and friction band or shoe, preferably by arranging a split band to surround the drum with its ends at the bottom of the drum, so that dirt and water will fall freely between the ends of the band. There is some novelty also in the means for supporting the band.

Another feature relates to an inexpensive but efficient arrangement of operating parts, embodying a novel spring link connecting an arm of a driver-operated bellcrank lever to a band-operating lever projecting laterally of the transmission.

Figure 1:
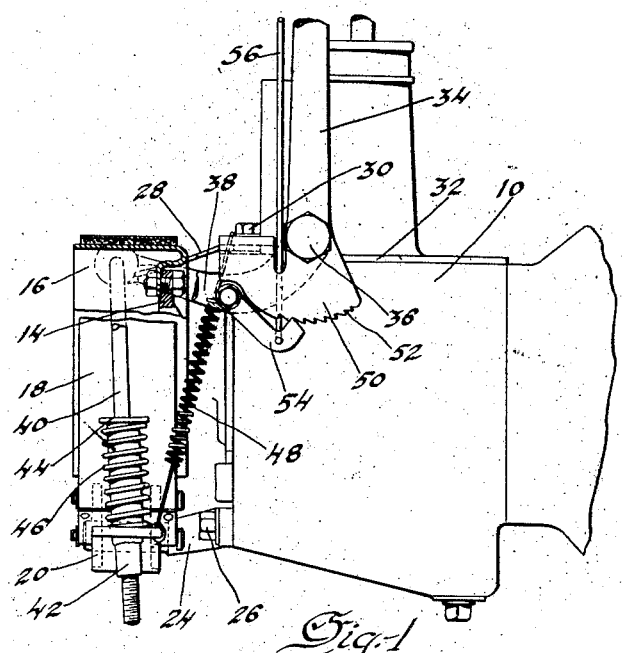
Figure 2:
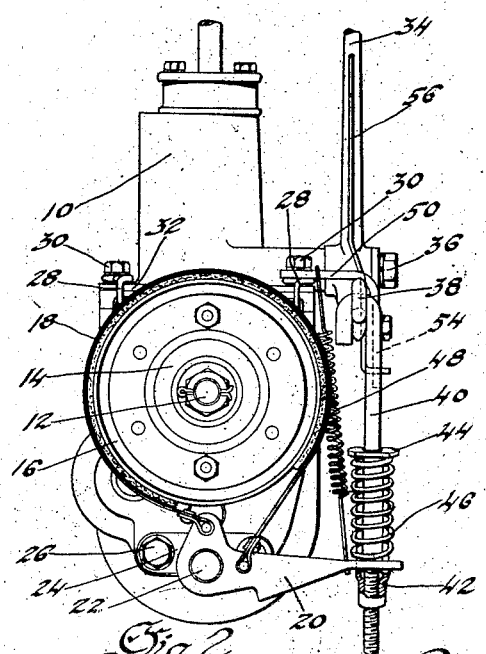

The above and other objects and features of the invention, including various novel combinations of parts and desirable particular constructions, will be apparent from the following description of one illustrative embodiment shown in the accompanying drawings, in which:

Figure 1 is a side elevation, partly broken away, of a transmission and brake; and Figure 2 is a rear elevation of the transmission and brake.

In the arrangement selected for illustration, and which is at present regular equipment on the Oakland and Olds cars, the transmission 10 has a projecting shaft 12 to which is secured a hub 14 carrying a pressed metal brake drum 16.

According to one feature of the present invention, and in order to prevent the accumulation of dirt or water between it and the drum 16, the band or shoe 18, shown as a split friction band, is arranged surrounding the drum and with its ends at the bottom of the drum. The opposite ends of the band 18 are connected to a novel band-operating sheet-metal bellcrank lever or arm 20 on opposite sides of its fulcrum, which may be a pivot 22 carried by a U-shaped stamping 24 secured to the transmission 10 by two tap screws 26. The lever 20 projects laterally at the right of the transmission. The band 18 is yieldingly urged away from the drum by a pair of spring fingers 28 looped about two of the tap screws 30 which hold the cover 32 of the transmission 10.

A driver-operated bellcrank lever 34, pivoted by a bolt 36 on a boss of the cover 32, is arranged with an arm 38 at right angles to the arm 20, and with a perforated portion vertically above the perforated end portion of the arm 20. A spring link is provided for connecting the two arms, the illustrated arrangement including a link 40 hooked into the opening in arm 38 and threaded at its lower end to receive a cup-shaped member 42 having a flange or stop 44 to engage one end of a coil spring 46, the spring being confined between the stop 44 and the arm 20.

Arm 20 is held against spring 46 by a light tension spring 48 connected to a bracket 50 which is L-shaped in cross-section, and which is held by the bolt 36 and by one tap screw 30 in a position where it extends across the arm 38 and down along the outside of the driver-operated lever. The bottom edge of this bracket is formed with ratchet teeth 52 engaging a pawl 54 pivoted on the arm 38 and controlled by a rod 56 extending to the top of lever 34 in the usual manner.

It will be seen that rocking lever 34 in a counter-clockwise direction (Figure 1) compresses spring 46 to apply the brake, the brake being held on as long as desired by pawl 54. Rocking lever 34 in a clockwise direction allows the spring 48 and spring fingers 28 to expand band 18 to release the brake.

A great advantage of the brake shown is that practically all the parts, either as shown or by reversing them, can be used in arranging the brake with lever 34 on the opposite side of the transmission, for cars with right hand drive (for export).

While one particular embodiment of the invention has been described in detail, it is not my intention to limit its scope to that particular embodiment, or otherwise than by the terms of the appended claims.

I claim:

1. A brake comprising, in combination, a transmission, a drum at the rear of the transmission, a brake band surrounding the drum with its ends at the bottom thereof, a band contracting member pivotally supported from the transmission at a point below said drum, and which member is connected with both ends of said band, and extends laterally to one side of the transmission, a brake lever pivoted on the transmission above said drum, and having an arm disposed above said band contracting member, and a connection from the lever for operating the band contracting member.

2. A brake as defined by claim 1, in which there are two spring fingers holding the brake band, and two tap screws securing the spring fingers and also serving as attaching means for the cover of the transmission.

3. A brake comprising, in combination, a transmission, a drum and band at the end of the transmission, a band-operating arm projecting at one side of the transmission, a bellcrank lever pivoted on the same side of the transmission and having an arm at right angles to the band-operating arm with a part in vertical alinement with a part of the band-operating arm, a link pivoted to the arm of the bellcrank lever and projecting downward through an opening in the band-operating arm, the link having a stop between the two arms, and a coil spring surrounding the link and confined between the stop and the upper surface of the band-operating arm.

4. A brake as defined by claim 3, in combination with a light tension spring holding the band-operating arm in engagement with the coil spring.

5. A brake as defined by claim 3, in combination with a pawl carried by the arm of the bellcrank lever, and a ratchet formed on the vertical part of a plate of L-shaped cross-section secured to the top of the transmission and projecting downwardly beside said arm.

In testimony whereof I affix my signature.

PERRY L. TENNEY.